United States Patent [19]

Stiem

[11] Patent Number: 5,199,465

[45] Date of Patent: Apr. 6, 1993

[54] TUBULAR PACKING CASINGS HAVING IMPROVED PEELABILITY

[75] Inventor: Michael Stiem, Eickeloh, Fed. Rep. of Germany

[73] Assignee: Wolff Walsrode Aktiengesellschaft, Walsrode, Fed. Rep. of Germany

[21] Appl. No.: 447,148

[22] Filed: Dec. 6, 1989

[30] Foreign Application Priority Data

Dec. 21, 1988 [DE] Fed. Rep. of Germany ....... 3842969

[51] Int. Cl.$^5$ .............................................. F16L 11/00
[52] U.S. Cl. .................................. 138/118.1; 428/34.8
[58] Field of Search ................... 138/118.1; 428/34.8; 426/105, 135, 138; 106/189, 203; 427/338, 339

[56] References Cited

U.S. PATENT DOCUMENTS

| | | | |
|---|---|---|---|
| 4,243,074 | 1/1981 | Strutzel et al. | 138/118.1 |
| 4,328,838 | 5/1982 | Asada et al. | 138/118.1 |
| 4,463,778 | 8/1984 | Judd et al. | 138/118.1 |
| 4,543,282 | 9/1985 | Hammer et al. | 138/118.1 X |
| 4,764,406 | 8/1988 | Hisazumi et al. | 138/118.1 X |
| 4,788,087 | 11/1988 | Wilke et al. | 138/118.1 X |
| 4,844,129 | 7/1989 | Bridgeford et al. | 138/118.1 |
| 4,915,963 | 4/1990 | Lustig et al. | 428/34.8 X |

FOREIGN PATENT DOCUMENTS

| | | |
|---|---|---|
| 0006551 | 1/1980 | European Pat. Off. . |
| 0088308 | 9/1983 | European Pat. Off. . |
| 0249793 | 12/1987 | European Pat. Off. . |
| 0286026 | 10/1988 | European Pat. Off. . |
| 1952464 | 5/1970 | Fed. Rep. of Germany . |
| 2841850 | 9/1977 | Fed. Rep. of Germany . |
| 3620165 | 12/1987 | Fed. Rep. of Germany . |

Primary Examiner—John M. Jillions
Assistant Examiner—John P. Darling
Attorney, Agent, or Firm—Sprung Horn Kramer & Woods

[57] ABSTRACT

Tubular packing casing having improved peelability including a coating comprising a protein coagulant and a polyvinyl alcohol on its inner surface.

10 Claims, No Drawings

TUBULAR PACKING CASINGS HAVING IMPROVED PEELABILITY

The invention relates to tubular packing casings, preferably food packing casings having an improved peelability (Easy-peel).

Tubular casings, especially made from regenerated cellulose, are often used as packing material for food and are widely used for the production of processed meat products such as sausage products. When the inside of such a food casing is used untreated, it is clear that the meat can adhere too strongly to the casing, especially with frankfurter type sausages. This leads to tearing out of meat residues from the sausage during peeling and is inconsistent with the requirement to ensure sausage slices of consistent diameter for stacked sliced cold meat.

In the case of the production of dry sausages' the sausage casing does not adhere sufficiently well to the meat, and as a result there is a partial separation from the sausage casing which is often accompanied by the undesired formation of an oil film and/or mould formation on the sausage material.

As a result of this separation, the food casing does not shrink together with the filling material, so that the sausage appears to be wrinkled and unattractive.

In order to eliminate these disadvantages, it is known in the art to provide the inside of the tubular food casing with a coating based on water-soluble cellulose ethers, a partialeiter of a fatty acid with sorbitol or mannitol, a water-soluble polyalkylene glycol ester or mineral or silicone oil, see U.S. Pat. Nos. 2 558 042, 2 588 367. 3 158 492, 3 898 348 and No. 4 137 947. In U.S. Pat. No. 2 988 451 polyvinyl pyrrolidone in combination with CMC has been mentioned, and in U.S. Pat. No. 3 383 223 glutaraldehvde.

DE-A 34 09 746 describes, inter alia, the use of colophonium, U.S. Pat. No. 4 463 778 the use of vinylacetate polymers. Polyvinyl alcohol and micro crystalline cellulose in combination with a triglyceride mixture is used according to EP-A-0 006 551. Furthermore, the following may be mentioned: starch, chromium fatty acid complex compounds, non-reactive dialkyl polysiloxanes as well as starch ethers in EP-A-0 101 892, DE-A 34 47, 026, DE-A- 28 41 850.

These inner coatings lead to reduced adherence, but they have a number of disadvantages. Additional separation of oil and fat occurs between sausage and casing, and the skins tend to detach. With dry sausages, mould can form in the gaps. The casing does not shrink with the filling and therefore becomes shrivelled and unattractive. Some coatings lead to embrittlement of the casing, thus to bursting during the packing or filling process.

Accordingly, the object of the present invention was to provide a tubular packing casing, preferably a tubular food casing, especially made from regenerated cellulose, which, with frankfurter type sausage, considerably reduces the relatively high adherence between the sausage casing and the sausage fillings provided for this type of sausage and which shows a higher separation effect, so that the sausage casing can be peeled without the application of great force. With dry sausages, it should prevent detachment during the drying process and inhibit separation of oil and fat. Furthermore, the inner coating should not have an embrittling effect on the casing material, so that such food casings can be packed without any problem and can be processed to filled products.

Tubular casings particularly from regenerated cellulose containing a protein coagulant as inner coating are already known from DE-A 36 20 165. Nevertheless, this coating does not serve to improve the peelability but rather to increase the adherence between the content of the food casing and the casing itself.

The invention provides a tubular packing casing provided with a coating on its inner surface for improving the peelability comprising a homogeneous mixture of at least two components, characterized in that the coating contains as components a protein coagulant A and a polyvinyl alcohol B.

In a preferred embodiment, the inner coating contains 10 to 200 mg/m$^2$, in particular 20 to 80 mg/m$^2$, of the components A+B.

Suitable as protein coagulant A are, preferably non-polymeric, organic, preferably aliphatic, optionally unsaturated, mono or polycarboxylic acids which may contain further functional groups, preferably OH-groups, or salts thereof, preferably alkali metal salts. Preferred compounds A are carboxylic acids having at least two carboxyl groups and at least one hydroxyl group. Particularly preferred compounds A are tartaric acid, citric acid, ascorbic acid, tetrahydroxyadipic acid and sorbic acid.

Preferably, the polyvinyl alcohol B is a saponified polyvinyl acetate, wherein the degree of saponification is generally at least 70%, preferably at least 90% and especially at least 99%.

The amount of the polyvinyl alcohol B to be used is generally from 20 to 90% by weight, preferably 50 to 70% by weight, more preferably 65 to 70% by weight, the amount of the protein coagulant A is generally 10 to 80% by weight, preferably 30 to 50% by weight, more preferably 30 to 35% by weight, each based on the two substances according to the invention.

Surprisingly, the tubular food casings which are provided with the inner coating according to the invention, show sufficiently strong adherence that they take part in the shrinkage during the drying process of the dry sausage without separating therefrom, nevertheless, the finished dry sausage can be peeled easily. Oil separation is prevented by the inner coating according to the invention.

Casings of this type may also preferably be used in the field of stacked cold meat slices, since they can be peeled off easily after the sausage has been produced and they counteract jelly and fat separation.

Preferably, the base material for the carrier tube is regenerated cellulose, which is produced in the usual way as a seamless tube from viscose solution. Preferably, the regenerated cellulose is reinforced with a non-woven fiber.

The production is generally known by extrusion or spinning of tubular packing casings from regenerated cellulose, which can if desired be fibre-reinforced, and which can if desired be coated on the outside with a water and gas impermeable coating in a known manner. In this case, in the last step of production, the optionally fibre-reinforced tube is coagulated, regenerated, washed, softened, and afterwards dried. The inner coating of the tubular casing according to the invention can take place preferably during the production process of the casing from regenerated cellulose or after the drying thereof. Thus, an aqueous solution, preferably a 0.5 to 5% by weight, especially a 1 to 3% by weight aqueous solution of the polyvinyl alcohol, which also contains the water soluble protein coagulant in amounts of generally 0.5 to 5, preferably 1 to 3% by weight, is filled into the tubular casing in the usual way. The continuous inner coating of the tubular casing is preferably carried out according to GB-A-1 201 830, U.S. Pat. No. 2 701 358 or DE-A-28 01 038.

There is no fluctuation in the adherence behavior towards the meat, which can occur with a casing which is not impregnated.

The inner coating can be used for cellulose casings, with or without fibre reinforcing and colors or pigments as desired. It can also be used for artificial casings from other base materials.

Further, the invention provides the use of the packing casings according to the invention for the packing of food, especially sausage meat.

EXAMPLES

The tubular packing casings provided for application or the additional inner coating were produced as follows: according to the usual procedure, a hemp paper web was formed into a tube and was covered with cellulose xanthate solution on one or both sides, which was then regenerated, softened and dried.

The treatment solution was applied to the inner surface either before or after the drying process.

The production of the sample sausages with dry sausage meat or frankfurter type sausage meat emulsion as filling material was carried out according to the usual procedure. The sausage casings were watered according to specification before the filling procedure. All data refer to weight % in aqueous solution.

EXAMPLE 1

In a continuous production process, a brown fibre skin, treated with viscose on both sides, cal. 60, was filled in the wet state with 3.5 l aqueous coating solution containing 1% tartaric acid and 1% polyvinyl alcohol (polyvinyl acetate hydrolysed to 99%), and the inner surface was coated therewith over a section having a length of 850m.

The pH-value of the coating solution was 2.6. Results:
a) filling with dry sausage meat: the casing was not separated after the drying period of the sausage, it showed only limited adherence to the meat during peeling and did not have any oil deposit.
b) filling with frankfurter type sausage meat: the casing was peeled after one day and showed medium strong meat adherence without meat residue. No deposit of jelly could be seen.

EXAMPLE 2

In a continuous production process, a natural colored fibrous casing, treated with viscose on both sides, cal. 109, was treated in the wet state with 5 l of an aqueous coating solution containing 1% tartaric acid, 2% polyvinyl alcohol (polyvinyl acetate hydrolysed to 99%), and the inner surface was coated therewith over a section having a length of 600m.

The pH-value of the solution was 2.8. The casings treated in this way were filled with frankfurter type sausage meat in the usual way, and peeled on the following day. The casing had a limited adherence to the meat, did not have any meat residues, and did not show any jelly separation.

EXAMPLE 3

In a continuous production process, about 700 m of a fibrous casing treated with viscose, cal. 65, were impregnated with 3 l aqueous coating solution, containing 1% tartaric acid, 2% polyvinyl alcohol (polyvinyl acetate hydrolysed to at least 90%).

The pH value of the solution was 2.3. With the insides of the casings coated in such a way, dry sausages were produced according to the usual production procedure and were peeled after the storage necessary for drying. The casing was not separated from the filling material and adhered only weakly to the meat. No meat residue or oil deposit could be seen.

EXAMPLE 4

In a continuous production process, a regenerated cellulose casing, treated with viscose on both sides, cal. 100, was filled, in the wet s with 4.5 l aqueous coating solution, containing 1% citric acid, 2% polyvinyl alcohol (polyvinyl acetate hydrolysed to 99%), and the inner surface was coated therewith over a section having a length of 500m.

The casings coated on the inside with the mixture given above were filled according to the usual procedure, with sausage meat emulsion and with cooked ham, and were peeled after the storage involved in the production procedure.

Results:
a) Filling with sausage meat: the casing was peeled after one day and had medium meat adherence without any meat residue. No jellyseparation could be seen.
b) Filling with cooked ham: the casing was not separated after the coating of the ham, it showed limited adherence to the meat during peeling and no discoloration of the filling material.

EXAMPLE 5

In a continuous production process, a fibrous casing, treated with viscose on both sides, cal. 109, was coated in the wet state on the inner surface with an aqueous solution containing 1% lactic acid and 2% polyvinyl alcohol (polyvinyl acetate hydrolysed to 99%) over a section of about 600m.

The casings treated in this way were filled, according to the usual procedure, with frankfurter type sausage meat and were peeled on the following day. They showed a weak adherence to the meat, without any meat residue, and did not show any jelly deposit.

EXAMPLE 6

A section of about 1m of a fibrous casing treated with viscose on both sides, cal. 105, was treated on the inside in the dry state with an aqueous solution containing 3% tartaric acid, 1% polyvinyl alcohol (polyvinyl acetate hydrolysed to 99%). The casings treated in this way were filled with frankfurter type sausage meat according to the usual procedure and were peeled on the following day. The casing showed only limited adherence to the meat and did not show any jelly deposit.

EXAMPLE 7

A section of about 1m of a fibrous casing, treated with viscose on one side, cal. 60, was coated in the dry state with an aqueous solution containing 1% tartaric acid, and 5% polyvinyl alcohol (polyvinyl acetate hydrolysed to 99%).

A dry sausage with a casing having such an inner coating was manufactured according to the usual procedure and was peeled after the storage necessary for drying.

The casing had not separated from the filling material and showed limited adherence to the meat during peeling. No oil deposit could be seen.

EXAMPLE 8

A fibrous casing, treated with viscose on both sides, cal. 105, was coated on the inner side over a section having a length of about 1m in the dry state with an aqueous solution, containing 1% ascorbic acid and 2% polyvinyl alcohol (polyvinyl acetate hydrolysed to 99%).

The casings were filled with frankfurter type sausage meat and peeled after one day. During peeling, the sausages showed limited adherence between casing and filling material and no jelly separation on the sausage cylinder.

In further experiments, ascorbic acid was replaced with acetic acid or GDL. The stuffing results with frankfurter type sausage meat were identical to those with ascorbic acid.

EXAMPLE 9

A section having a length of about 1m of the fibrous casing described in example 7 was coated on the inner surface in the dry state with an aqueous coating solution containing 1% acetic acid, 3% polyvinyl alcohol (polyvinyl acetate hydrolysed to 99%).

Dry sausages were manufactured with the casings having such an inner coating, according to the usual production procedure and peeled after the storage necessary for drying.

The casing had not separated from the filling material and had only limited adherence to the meat during peeling. No oil deposit could be seen.

The same results were obtained with ascorbic acid or gluconic acid-δ-lactone.

COMPARATIVE EXAMPLE 1

A section having a length of about 1m of the fibrous casing described in example 7 was coated in the dry state on the inner side with an aqueous coating solution containing 6% polyvinyl alcohol (polyvinyl acetate hydrolysed to 99%) without adding a protein coagulant.

Dry sausages were produced with the casings having such inner coatings and were peeled after the storage necessary for maturation.

The casing had not separated from the filling material and had a very weak adherence to the meat during peeling. The sausage was covered all over with oil.

COMPARATIVE EXAMPLE 2

A section having a length of about 1m of the fibrous casing described in example 7 was treated on the inside in the dry state with the following solution, which essentially corresponds to the coating according to example 4 of EP-A-6551:1.26% polyvinyl alcohol (polyvinyl acetate hydrolysed to 99%), 1.34% polyoxyethylene sorbitol mono oleate (instead of ethoxylated soya oil), 13.4% olive oil. According to the usual procedure, a dry sausage was manufactured and peeled after the storage necessary for drying. The casing had not separated from the filling mass and had a very good adherence to the meat during peeling. No oil deposit could be seen.

I claim:

1. Tubular packing casing provided with a coating on its inner surface for improving the peelability comprising a homogeneous mixture of at least two components, characterized in that the coating contains as components a protein coagulant A and a polyvinyl alcohol B.

2. Packing casing according to claim 1, characterized in that the inner coating consists essentially of 10 to 200 mg/m$^2$ of the components B.

3. Packing casing according to claim 1, characterized in that the inner coating consists 20 to 80 mg/m$^2$ of the components A+B.

4. Packing casing according to claim 1, characterized in that at least one non-polymeric organic carboxylic acid is included as protein coagulant A.

5. Tubular packing casing according to claim 1, characterized in that a carboxylic acid having at least two carboxyl groups and at least one hydroxy group is included as protein coagulant A.

6. Tubular packing casing according to claim 1, characterized in that the polyvinyl alcohol is a polyvinyl acetate having a degree of saponification of at least 70%.

7. Tubular packing casing according to claim 1, characterized in that the protein coagulant A is tartaric acid or citric acid.

8. Packing casing according to claim 1, characterized in that the amount of protein coagulant A used is 10 to 805 by weight and the amount of the polyvinyl alcohol B is 20 to 90% by weight based on the sum of both substances.

9. Tubular packing casing according to claim 1, characterized in than the casing is a food casing made from regenerated cellulose.

10. A filled tubular casing according to claim 1.

* * * * *

UNITED STATES PATENT AND TRADEMARK OFFICE
CERTIFICATE OF CORRECTION

PATENT NO. : 5,199,465
DATED : April 6, 1993
INVENTOR(S) : Micha3l Stiem It is certified that error appears in the above-identified patent and that said Letters Patent is hereby corrected as shown below:

Col. 6, line 27   After " components " insert -- A + --

Col. 6, line 47   Delete " 805 " and substitute -- 80 % --

Col. 6, line 51   Delete " than " and substitute -- that --

Signed and Sealed this

Thirteenth Day of September, 1994

Attest:

BRUCE LEHMAN

Attesting Officer

Commissioner of Patents and Trademarks